(12) United States Patent
Takashima et al.

(10) Patent No.: US 7,784,023 B2
(45) Date of Patent: Aug. 24, 2010

(54) PROGRAM CREATING SYSTEM, PROGRAM CREATING PROGRAM, AND PROGRAM CREATING MODULE

(75) Inventors: Norikazu Takashima, Tokyo (JP); Ayumu Oikawa, Tokyo (JP)

(73) Assignee: Japan Tobacco Inc., Tokyo (JP)

( * ) Notice: Subject to any disclaimer, the term of this patent is extended or adjusted under 35 U.S.C. 154(b) by 961 days.

(21) Appl. No.: 10/568,504

(22) PCT Filed: Aug. 17, 2004

(86) PCT No.: PCT/JP2004/011779

§ 371 (c)(1),
(2), (4) Date: Sep. 7, 2006

(87) PCT Pub. No.: WO2005/020071

PCT Pub. Date: Mar. 3, 2005

(65) Prior Publication Data
US 2007/0168911 A1    Jul. 19, 2007

(30) Foreign Application Priority Data
Aug. 20, 2003  (JP) .............................. 2003-296762

(51) Int. Cl.
*G06F 9/44* (2006.01)
*G06F 15/16* (2006.01)
*H04L 12/58* (2006.01)
(52) U.S. Cl. ....................... 717/106; 717/113; 717/121; 709/217; 455/412.1
(58) Field of Classification Search ................. 717/106, 717/113, 121; 709/217; 455/412.1
See application file for complete search history.

(56) References Cited

U.S. PATENT DOCUMENTS

| 4,992,971 | A | * | 2/1991 | Hayashi ...................... 717/140 |
| 5,878,262 | A | * | 3/1999 | Shoumura et al. ........... 717/164 |
| 5,937,188 | A | * | 8/1999 | Freeman ..................... 717/104 |
| 6,091,895 | A |   | 7/2000 | Govindaraj |
| 6,681,386 | B1 |  | 1/2004 | Amin et al. |
| 6,851,106 | B1 | * | 2/2005 | Narisawa et al. ............ 717/108 |
| 6,934,532 | B2 | * | 8/2005 | Coppinger et al. ....... 455/412.1 |
| 7,016,864 | B1 |   | 3/2006 | Notz et al. |
| 7,152,229 | B2 | * | 12/2006 | Chong et al. ................ 717/146 |
| 7,257,620 | B2 | * | 8/2007 | Lo ............................. 709/217 |

(Continued)

FOREIGN PATENT DOCUMENTS

CA    2 381 832 A1    10/2002

(Continued)

*Primary Examiner*—Wei Y Zhen
*Assistant Examiner*—Chih-Ching Chow
(74) *Attorney, Agent, or Firm*—Birch, Stewart, Kolasch & Birch, LLP

(57) ABSTRACT

An accepting unit (110) accepts various parameters required to create a program from a setting apparatus (500) through a network. A producing unit (112) loads a model of a program code from a model storing unit (128) on the basis of the parameters and replaces a part of the program code with the parameters to produce a source code. An instructing unit (120) detects that the producing unit (112) produces the source code to start a compiling unit (114). The compiling unit (114) compiles the source code produced by the producing unit (112) to create a research program. In this manner, a research program can be automatically created without advanced special knowledge.

21 Claims, 9 Drawing Sheets

U.S. PATENT DOCUMENTS

| | | | |
|---|---|---|---|
| 7,313,785 B2 * | 12/2007 | Van Gennip et al. | 717/130 |
| 2001/0046862 A1 | 11/2001 | Coppinger et al. | |
| 2002/0078168 A1 | 6/2002 | Christfort et al. | |
| 2002/0169591 A1 | 11/2002 | Ryzl | |
| 2003/0051226 A1 | 3/2003 | Zimmer et al. | |
| 2003/0135842 A1 * | 7/2003 | Frey et al. | 717/121 |
| 2003/0149958 A1 * | 8/2003 | Baluja et al. | 717/106 |
| 2003/0177501 A1 * | 9/2003 | Takahashi et al. | 725/110 |
| 2004/0181777 A1 * | 9/2004 | Fam | 717/114 |
| 2004/0205706 A1 * | 10/2004 | Portwood | 717/113 |
| 2007/0168912 A1 * | 7/2007 | Takashima et al. | 717/101 |

FOREIGN PATENT DOCUMENTS

| | | |
|---|---|---|
| JP | 2002-108634 A | 4/2002 |
| JP | 2002-182910 A | 6/2002 |
| JP | 2003-22184 A | 1/2003 |
| JP | 2003-044432 A | 2/2003 |
| JP | 2003-208307 A | 7/2003 |
| TW | 533377 B | 8/1996 |
| TW | 498237 B | 8/2002 |
| WO | WO-02/21322 A2 | 3/2002 |

* cited by examiner

FIG. 5

| RESEARCH SHEET EDITION |
|---|

[NEW] [UPDATE]　　　　　　　　　　　　[OPERATION] [RETURN]

460 — RESEARCH INFORMATION
| RESEARCH ID | 83 |
| RESEARCH NAME | FILLED MERCHANDISE RESEARCH |
| DATA TRANSMISSION URL | http://aaa.OOO.com/data ▽ |
| UPDATE DATE | 2003/07/24 12:06:13 |

462 — EDIT QUESTION [SA ▽] [ADD QUESTION] [ADD LOOP PROCESS SELECTING SCREEN]　　NO GPS ○
　　　　　　　　470─┘　476　　└472　478　─496　　484

PAGE 1　　　　　　　　　　　　　　　　　　　　　　　　　GPS ○ ─ 474
Q1 (Text)　[ADD ANSWER] [×] CONFIRMATION ☑ IMAGE [NONE　▽] ─ 486
QUESTION [　　　　　　　　　　　　　　　　　] ─ 480
464a — ANSWER 1 [INPUT VENDING MACHINE ID] LENGTH [4] NUMERICAL ITEM ☑ [×] ─ 494
　　　　　　　└482　　　　　　　　　　　└488　　　　　└490

PAGE 2　　　　　　　　　　　　　　　　　　　　　　　　　GPS ⦿
Q2 (Text)　[ADD ANSWER] [×] CONFIRMATION ☑ IMAGE [NONE　▽]
QUESTION [　　　　　　　　　　　　　　　　　]
ANSWER 1 [　　　　　　　　　　　] LENGTH [3] NUMERICAL ITEM ☑ [×]

PAGE 3　　　　　　　　　　　　　　　　　　　　　　　　　GPS ○
Q3 (SA)　[ADD ANSWER] [×] CONFIRMATION ☑ IMAGE [image1.png ▽]
464b — QUESTION [Q1) IS MERCHANDISE A FILLED?]
ANSWER 1 [FILLED]　　　　LINK [NONE ▽] [×] ─ 492
ANSWER 2 [NOT FILLED]　　LINK [NONE ▽] [×]

⋮

PAGE 5　　　　　　　　　　　　　　　　　　　　　　　　　GPS ○
Q5 (MA)　[ADD ANSWER] [×] CONFIRMATION ☑ IMAGE [NONE ▽]
QUESTION [Q2 IS THIS VM...]
464c — ANSWER 1 [...POP IS PRESRNT]　　[×]
ANSWER 2 [UNIQUE POP IS PRESENT] [×]
ANSWER 3 [NOTHING]　　　　　　　[×]

⋮

452 ─ [PRODUCTION]　　　　[CANCEL] ─ 454

```
⋮
<PARAMETER>  ─151a
    <RESEARCH ID>83</RESEARCH ID>  ─152
    <NAME> FILLED MERCHANDISE RESEARCH</NAME>  ─154
    <URL>http://aaa.OOO.com/data</URL>  ─156
    <PAGE>
        <PAGE NO.>1<PAGE NO.>  ─162
        <COMPONENT>
            <DATA NAME>deta1</DATA NAME>  ─164
            <TYPE>Text<TYPE>  ─166
            <CHARACTER STRING> INPUT VENDING MACHINE ID
            </CHARACTER STRING>  ─168
            <CHARACTER TYPE> NUMBER</CHARACTER TYPE>  ─170
            <NUMBER OF CHARACTERS>4</NUMBER OF CHARACTERS>
        </COMPONENT>  ─172
    </PAGE>
    <PAGE>
        <PAGE NO.>2</PAGE NO.>
        <COMPONENT>
            <DATA NAME>data2</DATA NAME>
            <TYPE>GPS</TYPE>
        </COMPONENT>
    </PAGE>
    <PAGE>
        <PAGE NO.>3</PAGE NO.>
        <QUESTION> Q1) IS MERCHANDISE A FILLED? </QUESTION>  180
        <IMAGE FILE NAME>image1.png</IMAGE FILE NAME>  ─182
        <COMPONENT>
            <DATA NAME>data3</DATA NAME>
            <TYPE>SA</TYPE>
            <CHARACTER STRING> FILLED</CHARACTER STRING>
            <CHARACTER STRING> NOT FILLED</CHARACTER STRING>
        </COMPONENT>
    </PAGE>
    ⋮
</PARAMETER>  ─151b
```

150

PROGRAM CREATING SYSTEM, PROGRAM CREATING PROGRAM, AND PROGRAM CREATING MODULE

TECHNICAL FIELD

The present invention relates to a technique which creates a program and, more particularly, to a technique which creates a program without causing a user to directly input a source code.

BACKGROUND ART

Computers are indispensable to daily life nowadays. The computers are mounted on various devices such as terminal devices, mobile telephones, home electric appliances to appropriately control hardware held by these devices and to realize predetermined functions. For example, mobile terminals are used to perform business management in companies, used to analyze experiment results in investigative organizations, and used to transmit and receive electronic mails and to browse web pages on a personal base. In general, in order to realize a predetermined function by using a computer, a program must be executed in a computer.

In order to create such a program, advanced special knowledge is necessary. For example, a source program is created by a programming language such as C language, C++ language, or JAVA (registered trademark). The source program is compiled by a compiler to create a machine language program which can be executed by a computer. Some technique automatically creates such a source program on the basis of a program specification in a tabular form (see Patent Document 1).

[Patent Document 1] Japanese Laid-open patent publication NO. 2003-208307

DISCLOSURE OF THE INVENTION

With spread of computers and diversification of application fields therefor, the number of necessary programs increases every year. Furthermore, a development period for such a program tends to be shortened. However, due to a chronic shortage of programmers, rapid advancement of program technique, rapid advancement of a device for executing a program, and the like, supply of a program is impossible when needed in many cases.

It is an object of the present invention to provide a technique which shortens a development period for a program, a technique which reduces required work to develop a program, and a technique which easily creates a program.

An aspect of the present invention is a system which creates a program. The system includes a screen information storing unit which holds screen information that forms an input screen of a parameter to create a first program that realizes a predetermined process, a providing unit which provides the screen information to a setting apparatus connected through a network, an accepting unit which accepts the parameter input on the input screen displayed on the basis of the screen information from the setting apparatus through the network, a producing unit which dynamically produces a source code of the first program on the basis of the parameter, a compiling unit which compiles the source code to create the first program that can be executed by a predetermined terminal device, and an instructing unit which detects that the source code is produced to instruct the compiling unit to compile the source code.

In this manner, on the basis of the parameter accepted through the network, the source code can be produced. The source code is compiled in response to the completion of the source code to make it possible to automatically create the first program. More specifically, when a user inputs a parameter by using a web browser, producing and compiling of the source are automatically performed to make it possible to create a predetermined program. Since the parameter can be accepted through the network, a plurality of users can use the system, and a user at a remote location can also use the system.

The system may further include a checking unit which checks that the data size of a first program is smaller than a predetermined size to make it possible to provide the first program to a terminal device when the data size of the first program is smaller than a predetermined size. In this manner, the program producing system can provide the program having a size smaller than the predetermined size to the terminal device. For example, even to a terminal device in which the size of an executable program is limited, a program satisfying the limit can be provided.

The system may further include a notifying unit which performs notification to urge the setting apparatus to reduce the number of parameters when the data size of the first program is larger than a predetermined size. In this manner, a user can recognize that the data size of the first program is larger than the predetermined size. The program can be created such that the data size of the program becomes smaller than the predetermined size by changing the number of parameters after recognizing that the data size is large.

The predetermined size may be set for each terminal device using the first program. In this manner, the program can be created depending on execution conditions of the program of each terminal device.

The system may further include a first program storing unit which stores a first program checked by the checking unit and a providing unit which provides the first program stored in the storing unit to the terminal device. The checking unit may store, when the data size of the first program created by the producing unit is smaller than the predetermined size, the first program in the storing unit. In this manner, a state in which the created program can be provided to the terminal device is achieved.

The system may further include a second program storing unit which holds a second program that causes the setting apparatus to form a limiting unit that limits the number of parameters such that the size of the first program becomes smaller than the predetermined size, and the providing unit may provide the second program to the setting apparatus together with the screen information. In this manner, since the number of parameters can be controlled on the setting apparatus side, a program can be effectively created.

Another aspect of the present invention is a system which produces a program. The system includes an acquiring unit which acquires screen information that forms an input screen of a parameter to create a program that realizes a predetermined process through a network, a display process unit which displays the input screen on a display unit on the basis of the screen information, a managing unit which accepts an input of a parameter depending on the input screen to manage the parameter, and a transmitting unit which outputs the parameter managed by the managing unit to a creating apparatus that creates the program through the network. In this manner, the creating apparatus can be used from a plurality of devices connected to the network.

The system may further include a limiting unit which limits the number of parameters such that the size of the program becomes smaller than a predetermined size, and the transmitting unit may output parameters within the limits imposed by the limiting unit to the creating apparatus. In this manner, since the number of parameters can be controlled before the parameters are transmitted to the producing device, a program can be effectively created.

The system may further include a notifying unit which performs notification to urge reduction of the number of parameters when the number of parameters must be limited.

The program includes a component serving as an input interface, the managing unit manages a plurality of parameters to form the component as a group, and the limiting unit may limit the number of parameters in units of groups.

The limiting unit may predict the data size of the program created by the creating apparatus depending on the parameter managed by the managing unit to determine whether or not the number of parameters must be reduced.

When the predicted data size of the program is larger than a predetermined size, the limiting unit may determine that the number of parameters must be reduced.

The limiting unit may compare the number of parameters managed by the managing unit with a predetermined number to determine whether or not the number of parameters must be reduced.

When the number of parameters managed by the managing unit is larger than a preset number, the limiting unit may determine that the number of parameters must be reduced.

An aspect obtained by converting arbitrary combinations of the above constituent elements and the expressions of the present invention between a method, a device, a system, a recording medium, a computer program, a module, and the like is also effective as an aspect of the present invention. For example, the present invention includes the following aspects.

(i) A program creating program causing a computer to realize:
- a screen information storing unit which holds screen information that forms an input screen of a parameter to create a first program that realizes a predetermined process;
- a providing unit which provides said screen information to a setting apparatus connected through a network;
- an accepting unit which accepts the parameter input on the input screen displayed on the basis of said screen information from said setting apparatus through said network;
- a producing unit which dynamically produces a source code of said first program on the basis of said parameter;
- a compiling unit which compiles said source code to create said first program that can be executed by a predetermined terminal device; and
- an instructing unit which detects that said source code is produced to instruct said compiling unit to compile the source code.

(ii) A program creating module causing a computer to realize:
- a screen information storing unit which holds screen information that forms an input screen of a parameter to create a first program that realizes a predetermined process;
- a providing unit which provides said screen information to a setting apparatus connected through a network;
- an accepting unit which accepts the parameter input on the input screen displayed on the basis of said screen information from said setting apparatus through said network;
- a producing unit which dynamically produces a source code of said first program on the basis of said parameter;
- a compiling unit which compiles said source code to create said first program that can be executed by a predetermined terminal device; and
- an instructing unit which detects that said source code is produced to instruct said compiling unit to compile the source code.

(iii) A program creating program causing a computer to realize:
- an acquiring unit which acquires screen information that forms an input screen of a parameter to create a program that realizes a predetermined process through a network;
- a display process unit which displays said input screen on a display unit on the basis of said screen information;
- a managing unit which accepts an input of a parameter depending on said input screen to manage the parameter; and
- a transmitting unit which outputs the parameter managed by said managing unit to a creating apparatus that creates said program through said network.

(iv) A program creating module causing a computer to realize:
- an acquiring unit which acquires screen information that forms an input screen of a parameter to create a program that realizes a predetermined process through a network;
- a display process unit which displays said input screen on a display unit on the basis of said screen information;
- a managing unit which accepts an input of a parameter depending on said input screen to manage the parameter; and
- a transmitting unit which outputs the parameter managed by said managing unit to a creating apparatus that creates said program through said network.

According to the present invention, there can be provided a technique in which a predetermined program is created by producing a source code on the basis of a parameter and compiling the source code, so that the predetermined program can be created without causing a user to directly input the source code.

BRIEF DESCRIPTION OF THE DRAWINGS

The objects described above, other objects, characteristics, and advantages will be apparent with reference to the following preferred embodiment and the following drawings accompanying the embodiment.

FIG. 5 is a diagram showing an example of an input screen displayed on a display unit in FIG. 4;

FIG. 6 is a diagram showing an example of a data structure of a parameter file output from a parameter managing unit in FIG. 4 to a limiting unit in FIG. 4;

BEST MODE FOR CARRYING OUT THE INVENTION

Figure 1:
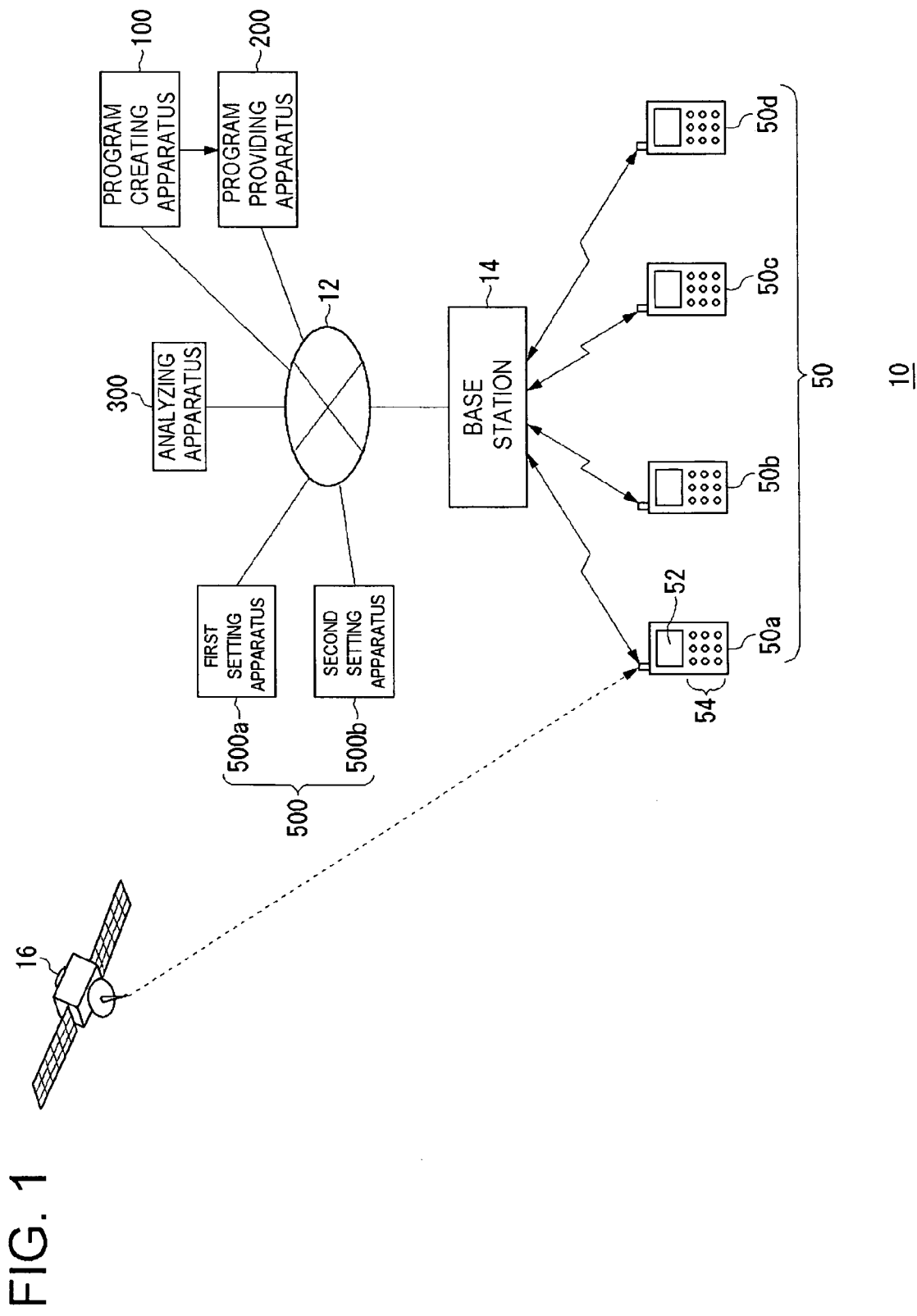
FIG. 1 is a block diagram of a researching system according to an embodiment.

FIG. 1 is a block diagram of a researching system 10 according to an embodiment. A first terminal device 50a, a second terminal device 50b, a third terminal device 50c, and a fourth terminal device 50d (to be simply referred to as "terminal device 50" hereinafter) are mobile terminals such as mobile telephones and PDAs (Personal Digital Assistants). The terminal device 50 may be a device in which an upper limit of the data size of a program is set as an execution condition of the program and which has a memory size smaller than that of a general terminal. The terminal device 50 has a GPS (Global Positioning System) unit which receives a GPS signal from, for example, a GPS satellite 16 to acquire position information, a CCD camera, a microphone, and the like. The terminal devices 50 are connected to a network 12 through a base station 14 and have functions of communicating with a program providing apparatus 200 and an analyzing apparatus 300.

A program creating apparatus 100 displays a research content on a display unit 52 of the terminal device 50, creates a program to accept a research result, and stores the program in the program providing apparatus 200. A first setting apparatus 500a and a second setting apparatus 500b (to be simply referred to as "setting apparatus 500" hereinafter) are connected to the program creating apparatus 100 through a network 12. The setting apparatus 500 accepts various pieces of information required to create a program in the program creating apparatus 100 from a user and outputs respective parameters to the program creating apparatus 100. The program creating apparatus 100 produces a program on the basis of the parameters and outputs the program to the program providing apparatus 200. More specifically, the program creating apparatus 100 provides information (to be simply referred to as "input screen information" hereinafter) to form an input screen, to which parameters required to create the program are input, to the setting apparatus 500. The setting apparatus 500 forms the input screen on the basis of the input screen information to accept the respective parameters from the user through the screen.

The program providing apparatus 200 provides the program to the terminal device 50 through the network 12. More specifically, the program creating apparatus 100 provides a program creating function serving as an ASP (Application Service Provider), and is formed so as to be used from the setting apparatus 500 connected to the network 12.

A researcher executes the program to perform a research on the basis of the research content displayed on the display unit 52. For example, the researcher moves to a designated point of research while holding the terminal device 50, and performs the research at the point. The terminal device 50 acquires position information (to be simply referred to as "research position information" hereinafter) of the moving point by using a GPS unit. The acquiring instruction may be performed on the basis of an instruction by the researcher, may be automatically performed by the program within the terminal device 50, or may be performed on the basis of a signal from outside. The researcher photographs a designated object by using the CCD camera of the terminal device 50 or inputs an item along the research content by using an operation unit 54 such as a key button.

Information to be acquired by the terminal device 50, except for the research position information, an image, and other information directly input by the researcher is used as not only a research result but also information to determine the reliability of the research result. More specifically, since data obtained from the GPS, the CCD camera, the microphone, and the like held by the terminal device 50 cannot be arbitrarily rewritten by the researcher in general, the data can be used as information which guarantees the reliability of the research result. The terminal device 50 transmits an item input by the researcher, the images obtained by the respective devices, the research position information, and the like to the analyzing apparatus 300 as research results. The analyzing apparatus 300 collects the research results to determine the reliabilities of the research results and then performs a predetermined analysis. In this manner, the analyzing apparatus 300 collects the research results associated with the research position information from a plurality of terminal devices 50.

Figure 2:
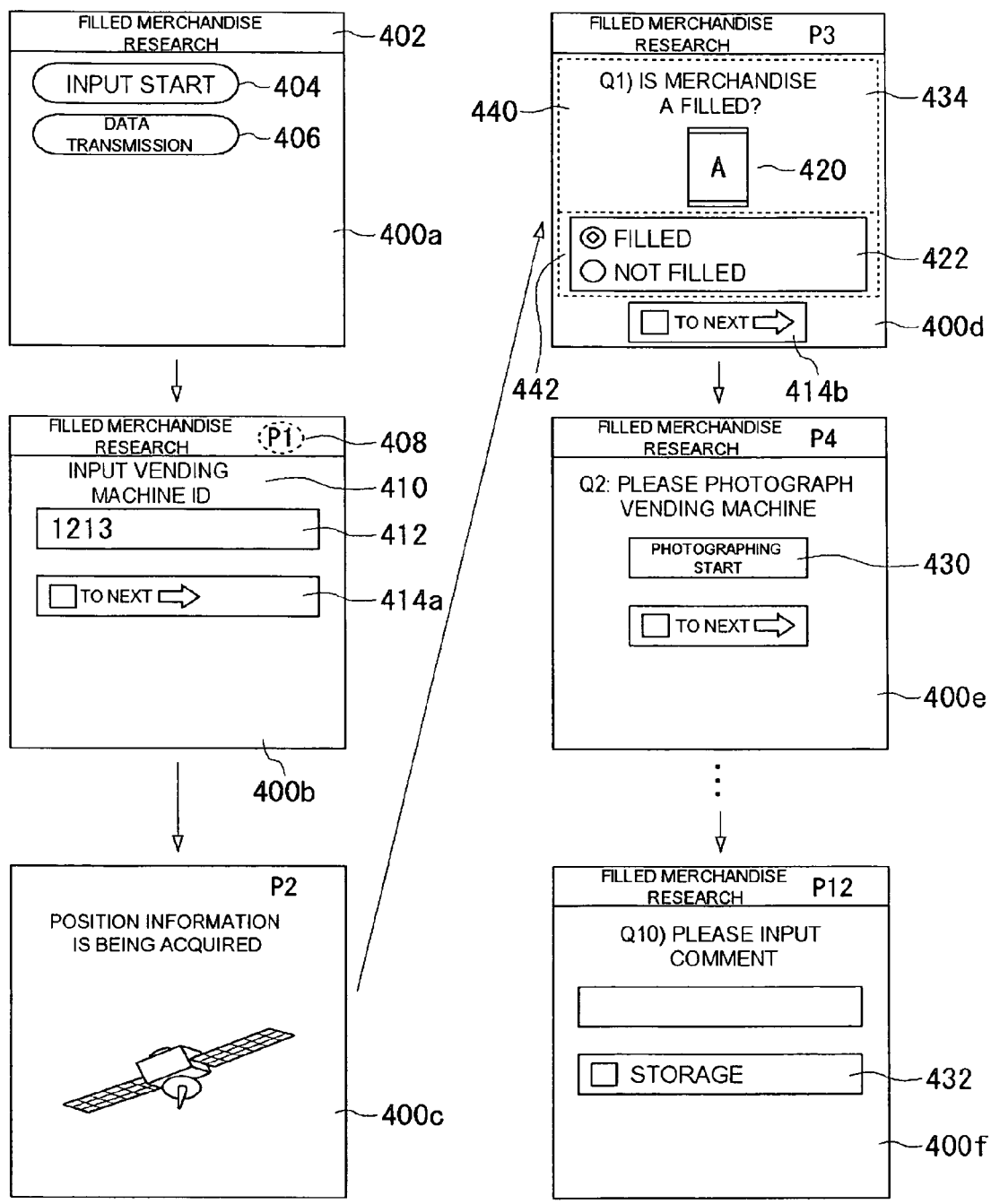
FIG. 2 is a diagram showing an example of transition of a work screen displayed on a display unit in FIG. 1.

FIG. 2 is a diagram showing an example of transition of a work screen 400 displayed on the display unit 52. A program is executed to display a first work screen 400a on the display unit 52 in FIG. 1 and sequentially displays a second work screen 400b, a third work screen 400c, a fourth work screen 400d, a fifth work screen 400e, and a sixth work screen 400f in the order named. The first work screen 400a has a title region 402, an input start button 404, and a data transmitting button 406. The title region 402 is a region to display, for example, a research name or the like, and is displayed on the upper side of the work screen 400.

The work screen 400 includes a research item designating region 440 to display information representing a research content and a research result input region 442 to which a researcher inputs a research result to the research content. As will be described later in detail, in order to clearly notify the researcher of the research content, the research item designating region 440 includes a research content character string 434 representing, for example, a research content, an appearance of, for example, merchandise related to the research content, and an image 420 to explain a technical term included in the research content. The research result input region 442 includes components such as a text box, a radio button, and a check box which will be described later, and is formed to make it possible to select an answer from, for example, options for the sake of effective and correct answering.

The input start button 404 is a button which accepts an instruction to start a research. The input start button 404 is selected to display a research item on the display unit 52. In this case, the research content is constituted by a plurality of research items. Upon completion of answering each research item, the data transmitting button 406 is used to transmit the answer as a research result to the analyzing apparatus 300 in FIG. 1. When the data transmitting button 406 is depressed, that is, selected, the research result is transmitted to the analyzing apparatus 300.

The second work screen 400b is displayed when the input start button 404 is depressed. In the embodiment, a page is set for each research item, and an answer input component suitable for the corresponding research item is arranged. A page number region 408 is a region which displays the page number. An answer content character string 410 is a region which displays a character string representing an answer content to be input to a text input region 412 (to be described later). The text input region 412 is a text box to input an answer. An arbitrary character string can be input to the text input region 412. A radio button group 422 on the fourth work screen 400d is a component to select one answer from options prepared in advance. Although not shown, a check box to select the arbitrary number of answers from the options prepared in advance may be set in the research result input region 442.

Returning to the second work screen 400b, a next screen display button 414a is a button to shift to a next research item.

The work screen 400 is switched by depressing the button. When the next screen display button 414a of the second work screen 400b is depressed, the third work screen 400c is displayed. At this time, the terminal device 50 acquires position information by using the GPS unit. Upon completion of acquisition of the position information, the fourth work screen 400d is displayed. When the research item on the fourth work screen 400d is answered to depress a next screen display button 414b on the fourth work screen 400d, the fifth work screen 400e is displayed. In this manner, the researcher inputs answers to a series of research items while sequentially switching the work screens 400.

A photographing start button 430 on the fifth work screen 400e is a button to perform photographing by using the CCD camera held by the terminal device 50 in FIG. 1. The CCD camera becomes active by depressing the photographing start button 430 to make it possible to perform photographing. In this manner, the program provided by the program providing apparatus 200 in FIG. 1 is coded such that data obtained by using the hardware such as the GPS unit or the CCD camera held by the terminal device 50 can be utilized as a research result.

The sixth work screen 400f serving as the final work screen 400 in this drawing has a storing button 432. The storing button 432 is a button to store an answer input on each work screen 400. When the storing button 432 is depressed, the data is stored in a storing region of the terminal device 50 as a research result. When the researcher selects the data transmitting button 406 on the first work screen 400a, the terminal device 50 transmits the research result, which is being stored, to the analyzing apparatus 300.

By employing the configuration in which the research result is stored and then transmission is performed as described above, for example, a research can be performed in an out-of-service area where no radio waves reach, and a research result can be transmitted in a service area where radio waves reach. More specifically, since a research can be performed without regarding an incoming signal strength, researches at various places can be performed. The research item and an input interface for an answer can be realized by a program so that an input interface suitable for the research item can be set. For this reason, an artificial mistake such as an input mistake can be prevented, and a prompt research can be performed. Furthermore, since the number of accesses to a server can be made considerably smaller than the number of accesses performed when a research item is provided on a web page, a load on the server can be reduced.

The program to display the work screen 400 may be a program created in a programming language such as JAVA (registered trademark). If the program is created by a programmer in each research, a necessary research cannot be performed at necessary timing due to a problem of the development period. As a result, a prompt research may not be performed. Further, the research items may include an erroneous research item or an erroneous option due to an artificial mistake. There may be a case of refraining from performing a research due to a problem of the development cost for the program.

For this reason, such a program must be automatically created to operate the researching system 10 in FIG. 1. In general, the program is created by compiling a source code. A programmer produces a source code by using various development tools. However, since advanced special knowledge is required for the operation, ordinary people cannot easily produce the source code.

The present inventor assumed various researches and studied the input interfaces for the researches. As a result, the present inventor reached a conclusion that input interfaces for each research items were unified to form models so that a source code can be automatically produced by a process of combining the models and a process of replacing character strings in the models with other character strings. The program creating apparatus 100 in FIG. 1 produces a source code according to this method, and automatically creates a program by compiling the source code.

Figure 3:
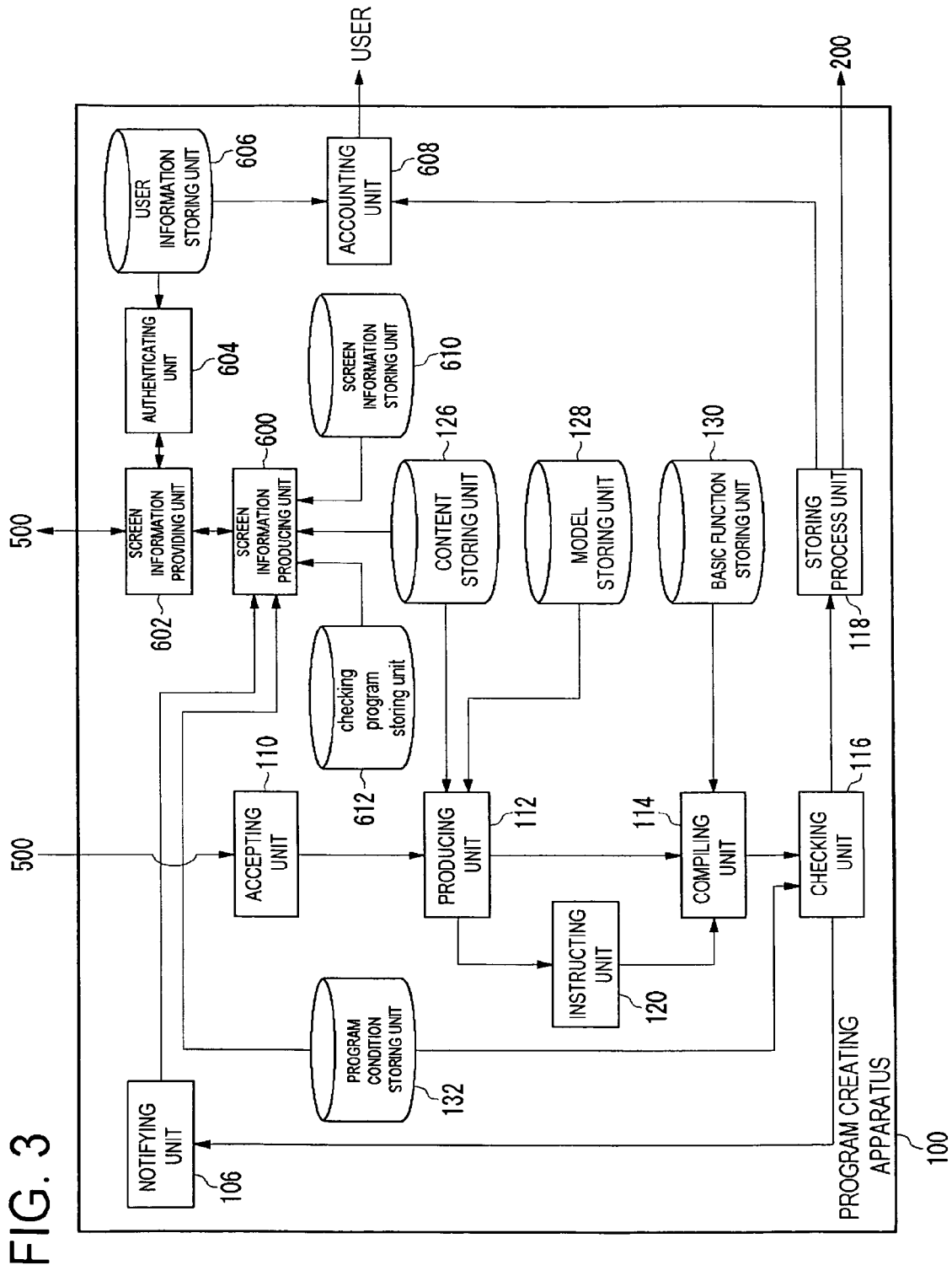
FIG. 3 is an internal block diagram of a program creating apparatus in FIG. 1.

FIG. 3 is an internal block diagram of the program creating apparatus 100 in FIG. 1. The respective constituent elements of the program creating apparatus 100 are realized by an arbitrary combination of hardware and software mainly selected from a CPU of an arbitrary computer, a memory, a program which realizes the constituent elements loaded on the memory in the drawing, a storage unit such as a hard disk for storing the program, and a network connection interface. It is apparent to a person skilled in the art that the method and apparatus for realizing the constituent elements include various modifications. The respective drawings to be explained below do not show configurations in units of hardware but show blocks in units of functions.

A screen information providing unit 602 provides input screen information to the setting apparatus 500. A screen information storing unit 610 holds various pieces of screen information such as, for example, a model of input screen information. A checking program storing unit 612 holds a checking program to realize a function (to be described later) in the terminal device 50 in FIG. 1. A screen information producing unit 600 produces input screen information on the basis of data held in the screen information storing unit 610 and the checking program storing unit 612 to supply the input screen information to the screen information providing unit 602. The screen information providing unit 602 transmits the input screen information to the setting apparatus 500.

In the embodiment, the screen information producing unit 600 produces a file in the HTML (Hyper Text Markup Language) format as input screen information. The checking program is a program which is created by an arbitrary program method such as JAVA (registered trademark) or ActiveX and which can be executed on the setting apparatus 500 side. Although will be describe later, the checking program uses the size of a program (to be simply referred to as "maximum program size" hereinafter) which can be executed by the terminal device 50 in FIG. 1 when executing the process. For this reason, the screen information producing unit 600 loads the maximum program size from a program condition storing unit 132 and adds the maximum program size to the input screen information. More specifically, the screen information providing unit 602 transmits the input screen information including the checking program, the maximum program size, and the screen information to form an input screen to the setting apparatus 500.

When the input screen information is requested by the setting apparatus 500, the screen information providing unit 602 requests an authenticating unit 604 to authenticate the setting apparatus 500. A user information storing unit 606 holds various pieces of information such as a user ID and a password related to a user. The authenticating unit 604 accepts authentication information to be used for authentication such as a user ID or a password of a user who operates, for example, the setting apparatus 500, and performs authentication with reference to the user information storing unit 606 on the basis of the authentication information.

When the authentication is passed, the authenticating unit 604 notifies the screen information providing unit 602 of the effect. In response to the notification, the screen information providing unit 602 requests the screen information producing unit 600 to produce input screen information. The screen information providing unit 602 transmits the produced input screen information to the setting apparatus 500.

An accepting unit 110 accepts a parameter to create a research program from the setting apparatus 500 and outputs the parameter to a producing unit 112. The parameter is supplied as, for example, a file (to be simply referred to as "parameter file" hereinafter) in the XML (extensible Markup Language) format. The producing unit 112 produces a source code of a research program on the basis of the parameter file. A model storing unit 128 holds a plurality of types of models to produce the source code. The producing unit 112 combines the models and inserts the parameters included in the parameter file into predetermined positions of the respective models or replaces predetermined character strings in the models with parameters to produce the source code.

The model storing unit 128 holds the models and information which specifies functions realized by the models, input interfaces, and the like in association with each other. For example, the model storing unit 128 holds program codes to realize these components in the terminal device 50 as models in association with the pieces of type information which specify a type of a component to input an answer.

In general, in various program languages, functions to realize predetermined processes are prepared as APIs (Application Program Interfaces) in advance. A source code is produced by combining the APIs according to a syntax of each of program languages. The model may be a program code obtained by combining, for example, a plurality of functions or a program code constituted by one function. In short, the model storing unit 128 may only hold component types and models thereof in association with each other.

Various algorithms to produce source codes on the basis of the parameter file are conceived. Models held by the model storing unit 128 are appropriately prepared depending on the algorithms.

For example, a model to form the research content display screen 400 having a text box as the research result input region 442 in FIG. 2 includes a character string display function to display a character string and a text box function to display a text box. Predetermined variable identifiers are allocated to, for example, arguments such that respective pieces of information such as a character string, a number, and an image included in the parameter file can be set to arguments of the functions. For example, the producing unit 112 may assign a parameter corresponding to the variable to produce a source code, or may replace the variable with the parameter to reproduce the source code.

Models to form the research content display screens 400 having a radio box and a check box as the research result input region 442 in FIG. 2 include character display functions, respectively, and include at least one of a radio box function displaying the radio box or a check box function displaying the check box. Program codes included in the models may be appropriately described depending on an algorithm to produce the source code on the basis of the parameter file. In short, the producing unit 112 may specify a function or a model to form the component of the type information on the basis of the type information included in the parameter file so as to set a parameter in the argument of the model.

When the parameter file includes the image file name column 182 in FIG. 6, the producing unit 112 loads a corresponding image content from a content storing unit 126 and outputs the image content to a compiling unit 114 together with the source code at predetermined timing. For example, the timing may be the time when the compiling unit 114 (to be described later) performs a compiling process.

Upon completion of production of the source code, the producing unit 112 outputs the effect as a source code completion notification to an instructing unit 120. For example, the producing unit 112 sequentially performs processes of conversion into source codes in units of the page configuration information columns 160 of the parameter file. Upon completion of conversion of all the page configuration information columns 160, the source codes are completed. At this time, that is, when conversion of all the page configuration information columns 160 is finished, the producing unit 112 may output the effect to the instructing unit 120. The producing unit 112 may sequentially perform processes of converting the parameter start tag 151a to the parameter end tag 151b into source codes on the basis of the respective parameters. When the parameter end tag 151b is converted, the converting processes may be ended, and a source code completion notification may be output to the instructing unit 120.

When the instructing unit 120 accepts the source code completion notification from the producing unit 112, the instructing unit 120 instructs the compiling unit 114 to compile the source code in response to the notification. A basic function storing unit 130 holds various files required for compiling. The compiling unit 114 converts the source code into an object code by using the file held in the basic function storing unit 130 to create a research program file.

A checking unit 116 checks that the research program created by the compiling unit 114 can be executed in the terminal device 50 in FIG. 1. In general, the terminal device 50 in FIG. 1 has a memory capacity smaller than that of, for example, a desktop computer or the like and has CPU performance inferior to that of the desktop computer or the like. For this reason, the maximum program size of an executable program is determined. When the size of the created research program is smaller than the maximum program size, the checking unit 116 determines that the program can be executed, and outputs the research program to a storing process unit 118. The storing process unit 118 outputs the research program to the program providing apparatus 200 to make it possible to distribute the research program.

An accounting unit 608 uses the program creating apparatus 100 to manage a utility rate in association with a user who created a distributable program.

On the other hand, when the size of the created research program is larger than the maximum program size, the checking unit 116 outputs information representing that the program size is so large that the program cannot be executed in the terminal device 50 to a notifying unit 106. On the basis of the information, the notifying unit 106 notifies a display process unit 104 that the program cannot be executed in the terminal device 50 because the program size exceeds the maximum program size, and outputs a message that urges the screen information producing unit 600 to reduce the number of research items. In this manner, the screen information producing unit 600 produces screen information to transmit the message to the setting apparatus 500 and outputs the screen information to the screen information providing unit 602. The screen information providing unit 602 transmits the screen information to the setting apparatus 500. In this manner, a message to inform that the program size exceeds the maximum program size and that the number of research items must be reduced to complete the program is displayed on the setting apparatus 500.

In this manner, the checking of the program size of the research program avoids an event where the research program can not be executed because the program size of the research program is larger than the maximum program size of the terminal device 50 in FIG. 1 that uses the research program.

The program condition storing unit 132 holds the maximum program size of the terminal device 50 in association with information (to be simply referred to as "terminal information" hereinafter) which specifies the terminal device 50 in FIG. 1. The checking unit 116 specifies the maximum program size to perform the checking operation with reference to the program condition storing unit 132. For example, the terminal information may be included in the parameter file.

A user simply inputs a research item to an input screen displayed on the setting apparatus 500 so as to produce a source code and to dynamically compile the source code, so that a research program can be created in the program creating apparatus 100.

Figure 4:
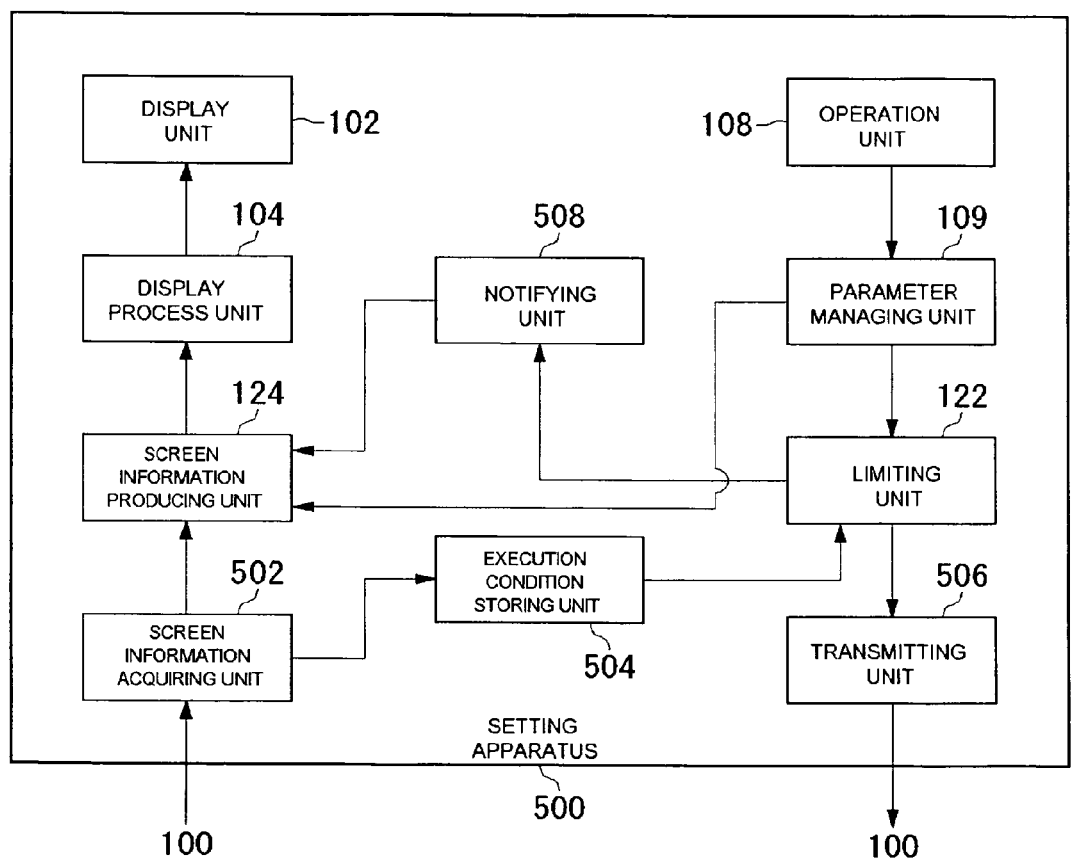
FIG. 4 is an internal block diagram of a setting apparatus in FIG. 1.

FIG. 4 is an internal block diagram of the setting apparatus 500 in FIG. 1. A screen information acquiring unit 502 acquires input screen information to form, on the display unit 102, an input screen to input various pieces of information required to form the above-described program for research (to be simply referred to as "research program" hereinafter) from the program creating apparatus 100. The screen information acquiring unit 502 stores the maximum program size included in the input screen information in an execution condition storing unit 504 to start the checking program. When the checking program is started, a limiting unit 122 (to be described later) and a notifying unit 508 (to be described late) are formed.

A screen information producing unit 124 produces screen information on the basis of the input screen information or notification from the notifying unit 508 (to be described later) and outputs the screen information to the display process unit 104. The display process unit 104 displays the input screen on the display unit 102 on the basis of the screen information.

An operation unit 108 is an input device such as a keyboard or a mouse, and accepts an operation from a user to output various pieces of information for the input screen to a parameter managing unit 109. The parameter managing unit 109 manages the input pieces of information as parameters in association with parameter names or the like. The screen information producing unit 124 loads the parameters managed by the parameter managing unit 109 and reflects a newly input parameter in the input screen. The parameter managing unit 109 outputs a parameter, which is being managed, as a parameter file to the program creating apparatus 100 at predetermined timing.

The limiting unit 122 limits the number of research items included in the research program on the basis of the parameters included in the parameter file. More specifically, on the basis of the program size of the research program finally created by the checking unit 116 in FIG. 3, the checking unit 116 checks whether or not the research program can be used in the terminal device 50, whereas the limiting unit 122 predicts whether or not the research program can be used in the terminal device 50 before the source code is produced by the program creating apparatus 100 in FIG. 3. When the predicted program size exceeds the maximum program size, the limiting unit 122 instructs the notifying unit 508 to notify that the number of research items is to be reduced. Since it is predicted depending on the instruction that the program size exceeds the maximum program size, the notifying unit 508 displays a message that urges reduction of the number of research items on the display unit 102. In this manner, a waste source code can be avoided from being produced and compiled. Since the process in the limiting unit 122 is performed on the setting apparatus 500 side, the program creating apparatus 100 is not burdened.

The limiting unit 122 loads the maximum program size depending on the terminal device 50 in FIG. 1 from the execution condition storing unit 504. The limiting unit 122 predicts the program size of the research program on the basis of the parameters included in, for example, the parameter file. For this reason, the limiting unit 122 holds a table in which parameter names, that is, the types of parameters are associated with program sizes. The limiting unit 122 may specify a program size for each parameter included in the parameter file with reference to the table, and may estimate the size of the research program by, for example, adding the program sizes.

When the limiting unit 122 accepts the parameter file from the parameter managing unit 109, the limiting unit 122 determines whether or not the number of research items must be reduced on the basis of the parameter file. When the number of research items need not be reduced, the limiting unit 122 outputs the parameter file to a transmitting unit 506. The transmitting unit 506 outputs the parameter file to the program creating apparatus 100.

FIG. 5 is a diagram showing an example of an input screen 450 displayed on the display unit 102 in FIG. 4. A various-information input region 460 is a region to input various pieces of information required to cause the research program to realize the above-described functions. An "research ID" is information to identify a research program. When, for example, a research result is transmitted to the analyzing apparatus 300 in FIG. 1, the research ID is transmitted in associated with the research result. The "research name" is a name for each research and is displayed in the title region 402 in FIG. 2. A "data transmission URL" is a region to input information to specify the analyzing apparatus 300 in FIG. 1 serving as a destination of the research result on the network 12. As the "data transmission URL", for example the URL (Uniform Resource Locator) of the analyzing apparatus 300 is set.

The component adding operation button group 462 is used when a research item is added. A type selection component 470 is a component to designate a type of a component used to input an answer of a research item to be added. As types of components which can be selected by the type selection component 470, a radio button (expressed as "SA" in FIG. 4) with which one answer can be selected from, for example, a plurality of options, a check box (expressed as "MA" in FIG. 4) with which the arbitrary number of answers can be selected from the plurality of options, and a text box (expressed as "Text" in FIG. 4) to input a text are present. An arbitrary type is selected from the type selection component 470, and a component adding button 472 is depressed, so that a component setting region 464 depending on a selected type is added.

Each component setting region 464 is constituted by components such as a text box and a check box such that information required to form the research item designating region 440 in FIG. 2 and information required to form the research result input region 442 in FIG. 2 can be input.

A first component setting region 464a is added when "text box" is selected as a component type. The type of the component is displayed in a type display region 476. In the first component setting region 464a, a question input region 480 and an image selection component 486 are arranged in order to form the research item designating region 440 in FIG. 2. An answer input region 482, a maximum-number-of-characters designating region 488, and an input character type designating box 490 are arranged in order to form the research result input region 442 in FIG. 2.

The question input region 480 is, for example, a region to input a document for instructing a matter to be researched by a researcher. A character string input thereto is displayed as the research content character string 434 in FIG. 2. The image selection component 486 is a component to select an image content displayed as the image 420 in FIG. 2 and is formed to make it possible to select an arbitrary image content from, for example, a list. The content storing unit 126 in FIG. 3 stores an image content. When the image selection component 486 is selected, the screen information acquiring unit 502 acquires a list of image contents held by the content storing unit 126 from the program creating apparatus 100. The screen information producing unit 124 may form the image selection component 486 by using the list.

The answer input region 482 is a region to input a character string to be displayed around the text box. The character string is arranged on any one of the upper side, the lower side, the left side, and the right side of the text box to input an answer. The maximum-number-of-characters designating region 488 is a region to set the upper limit of the number of characters which can be input to the text box. The input character type designating box 490 is a check box to designate a character type which can be input to the text box. In the embodiment, the check box is checked so that only a number can be input, and the check box is unchecked so that an arbitrary character type such as a katakana character, a kanji character, an alphabet, a number, or the like can be input. The answer input region 482, the maximum-number-of-characters designating region 488, and the input character type designating box 490 are associated with each other.

In FIG. 5, "input vending machine ID" is filled in the answer input region 482, "4" is filled in the maximum-number-of-characters designating region 488, and the input character type designating box 490 is checked. In this manner, the second work screen 400b in FIG. 2 is formed. More specifically, "input vending machine ID" is displayed as the answer content character string 410 above the text input region 412. Only a number can be input to the text input region 412, and the maximum number of characters is set at four.

Returning to FIG. 5, the answer input region 482 is added by depressing an answer adding button 478. More specifically, when a plurality of text boxes are arranged as the research result input region 442 in FIG. 2, the answer adding button 478 is depressed a desired number of times. In this manner, the answer input regions 482, the number of which corresponds to the number of times of depression of the answer adding button 478, are newly added to the first component setting region 464a. In each of the added answer input regions 482, character strings can be independently set. As a matter of course, the maximum-number-of-characters designating region 488 and the input character type designating box 490 associated with each answer input region 482 can be independently set. Furthermore, the answer input regions 482 for a radio button and a check box are added by depressing the answer adding buttons 478 in a second component setting region 464b (to be described later) and a third component setting region 464c (to be described later), respectively.

An answer deletion component 494 is a component to delete the answer input region 482. The answer deletion component 494 is depressed to delete the corresponding answer input region 482.

A radio button 474 is a component to designate whether or not position information is associated with a research result, that is, the GPS unit held by the terminal device 50 in FIG. 1 is used. When the radio button 474 is checked, the position information is associated with the research result. In the embodiment, when the radio button 474 in any one of the component setting regions 464 is checked, a research program is executed. Thereafter, the position information is acquired at any timing.

A research item deletion component 496 is a component to delete a research item. The research item deletion component 496 is depressed to delete the component setting region 464 of the corresponding research item.

The second component setting region 464b is added when a "radio button" is selected as a component type. A character string input to the answer input region 482 of the second component setting region 464b is displayed in association with each radio button. More specifically, each option is input to each answer input region 482. A link designating region 492 is a component not to sequentially display research items but to designate whether or not another designated research item is displayed as a link when the answer is selected. For example, the link designating region 492 is formed to make it possible to select an arbitrary research item from the list of research items. When the radio button is selected, a screen of the research item designated as a link is displayed.

The third component setting region 464c is added when a "check box" is selected as a component type. A character string input to the answer input region 482 of the third component setting region 464c is displayed in association with each check box. More specifically, each option is input to each answer input region 482.

Such a display process is realized such that information to form the input screen 450 is rewritten as needed by the screen information producing unit 124 on the basis of a parameter updated depending on an operation by a user on the operation unit 108 in FIG. 3.

A producing button 452 is a button to instruct that a source code is produced by using various pieces of information input to the input screen 450. A cancel button 454 is a button to cancel inputting to the input screen 450. When the producing button 452 is depressed, the parameter managing unit 109 in FIG. 4 outputs a parameter under control to the limiting unit 122. Although various output modes of parameters are present, in the embodiment, the parameter managing unit 109 outputs respective parameters to the limiting unit 122 as files (to be simply referred to as "parameter files" hereinafter) in the XML (extensible Markup Language) format.

FIG. 6 is a diagram showing an example of a data structure of a parameter file output to the limiting unit 122 by the parameter managing unit 109 in FIG. 4. All parameters to create one research program are held between a parameter start tag 151a representing the start of the parameters and a parameter end tag 151b representing the and of the parameters. Each parameter is held between tags representing names of parameters. A research ID column 152, a name column 154, and a URL column 156 respectively hold an "research ID", an "research name", and a "data transmission URL", all of which are input to the various-information input regions 460 in FIG. 5. Various pieces of information input to the component setting region 464 in FIG. 5 are held between tags in a page configuration information column 160. In the embodiment, one page, that is, information to form one work screen 400 in FIG. 2 is included in one page configuration information column 160.

A page number column 162 holds page identifying information which identifies a page, and may hold, for example, an order of pages to be displayed. More specifically, a producing unit 112 (to be described later) in FIG. 3 determines an order of pages to be displayed on the basis of the page identifying information, and produces a source code so as to display the respective pages in the order. When the component adding button 472 in FIG. 5 is operated to add the component setting region 464, the page identifying information is allocated in the component setting region 464 in, for example, an ascending order by the parameter managing unit 109 in FIG. 4.

A component column 174 holds various pieces of information to form the research result input region 442 in FIG. 2. A data name column 164 holds a data name which specifies an answer input or selected by the component. When a research result is transmitted to the analyzing apparatus 300, the terminal device 50 in FIG. 1 transmits an answer in association with the data name. As another example, when a research result is transmitted in a CSV format, the data name need not be set.

A type column 166, for example, holds type information which specifies types of components such as a text (expressed as "Text" in FIG. 5), a radio box (expressed as "SA" in FIG. 5), and a check box (expressed as "MA" in FIG. 5). Information which identifies a component to control hardware of the terminal device 50 such as a GPS component which acquires position information and a photographing component which photographs an image by using a CCD camera is also held in the type column 166 as type information.

A character string column 168 holds a character string input to the answer input region 482 in FIG. 5. A character type column 170 holds information which specifies a type of a character which can be input. In the embodiment, "number" is set when the input character type designating box 490 in FIG. 5 is checked, and information representing a type of an arbitrary character is set when the input character type designating box 490 is not checked. A number-of-character column 172 holds a number input to the maximum-number-of-characters designating region 488 in FIG. 5.

When a text is held in the type column 166, the component column 174 includes the character type column 170 and the number-of-character column 172 to form a text box. When "SA" representing a radio box or "MA" representing a check box is held in the type column 166, the component column 174 includes the character string columns 168, the number of which corresponds to the number of branches of options, in order to form a text box or a check box.

A question column 180 holds a character string input to the question input region 480 in FIG. 5. An image file name column 182 holds a file name of an image file selected by the image selection component 486 in FIG. 5. In another example, the image file name column 182 may hold a path or a URL representing a storing place of the image file.

The parameter managing unit 109 in FIG. 4 outputs a parameter file, in which the respective parameters to form the work screen 400 in FIG. 2 are held while being grouped for each research item, that is, for each page configuration information column 160, to the limiting unit 122 in FIG. 4.

The limiting unit 122 may compare the number of page configuration information columns 160 in FIG. 6 included in the parameter file with the upper limit (to be simply referred to as the "maximum number of items" hereinafter) of the number of preset research items to limit the number of research items. For example, the limiting unit 122 may notify the notifying unit 106 that the number of research items is to be reduced when the number of page configuration information columns 160 in FIG. 6 included in the parameter file is larger than the maximum number of items.

Figure 7:
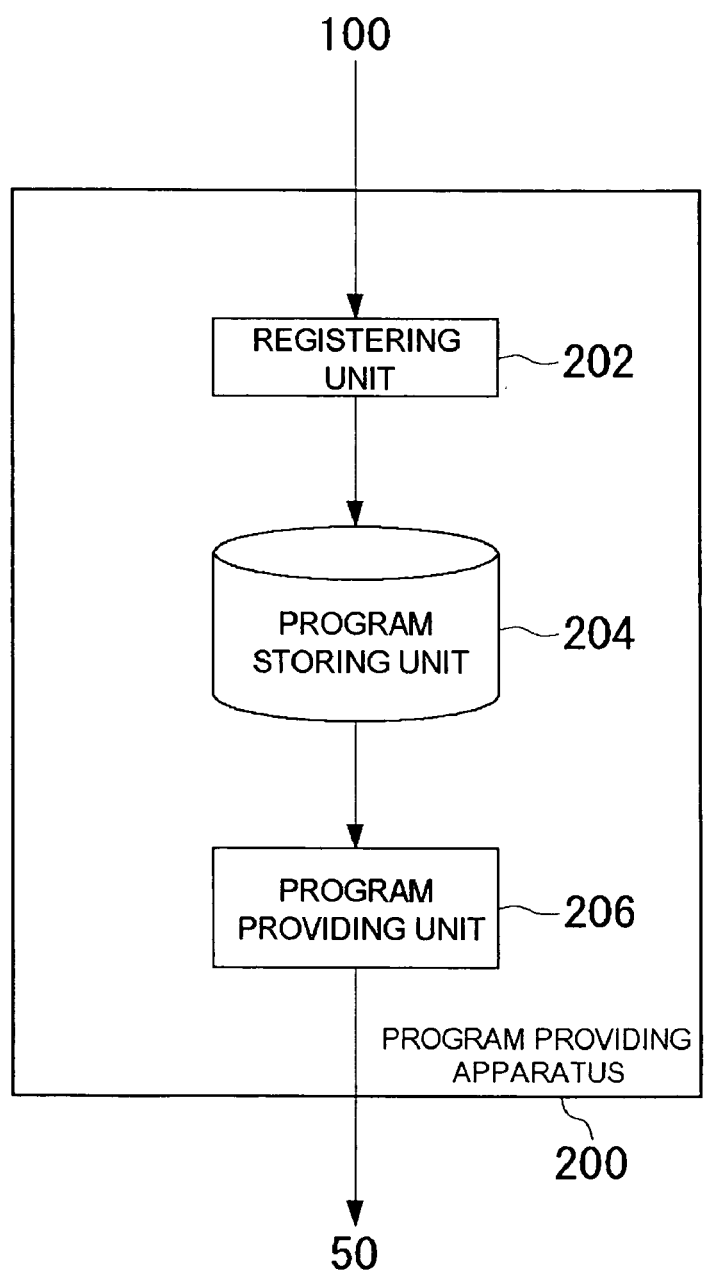
FIG. 7 is an internal block diagram of a program providing apparatus in FIG. 1.

FIG. 7 is an internal block diagram of the program providing apparatus 200 in FIG. 1. A registering unit 202 accepts the research program from the program creating apparatus 100. The registering unit 202 stores the accepted research program in a program storing unit 204. A program providing unit 206 provides the research program stored in the program storing unit 204 in response to a request from the terminal device 50. When the program providing unit 206 provides the research program, the program providing unit 206 authenticates a researcher by using identification information or the like uniquely allocated to, for example, the terminal device 50. When the authentication is passed, the program providing unit 206 may provide the research program to the terminal device 50.

Figure 8:
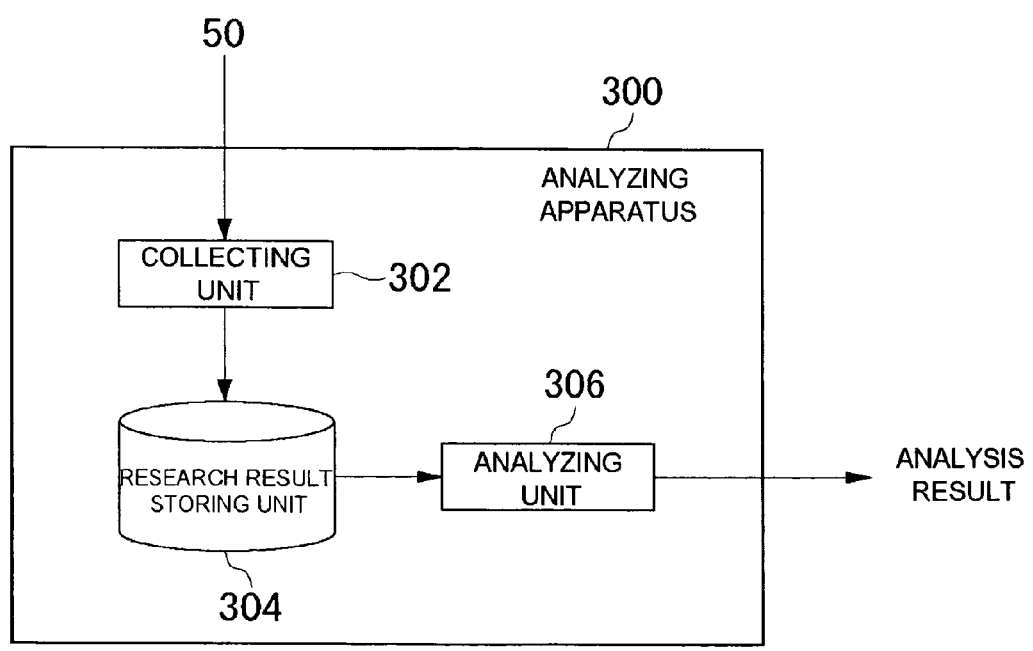
FIG. 8 is an internal block diagram of an analyzing apparatus in FIG. 1.

FIG. 8 is an internal block diagram of the analyzing apparatus 300 in FIG. 1. A collecting unit 302 accepts a research result from the terminal device 50. The collecting unit 302 collects the research result from the terminal device 50 in, for example, a CSV format, a format associated with a parameter name representing a research item. The collecting unit 302 stores the research result in a research result storing unit 304. An analyzing unit 306 performs a predetermined analysis such as statistical counting to output an analysis result on the basis of a research result stored in the research result storing unit 304.

Figure 9:
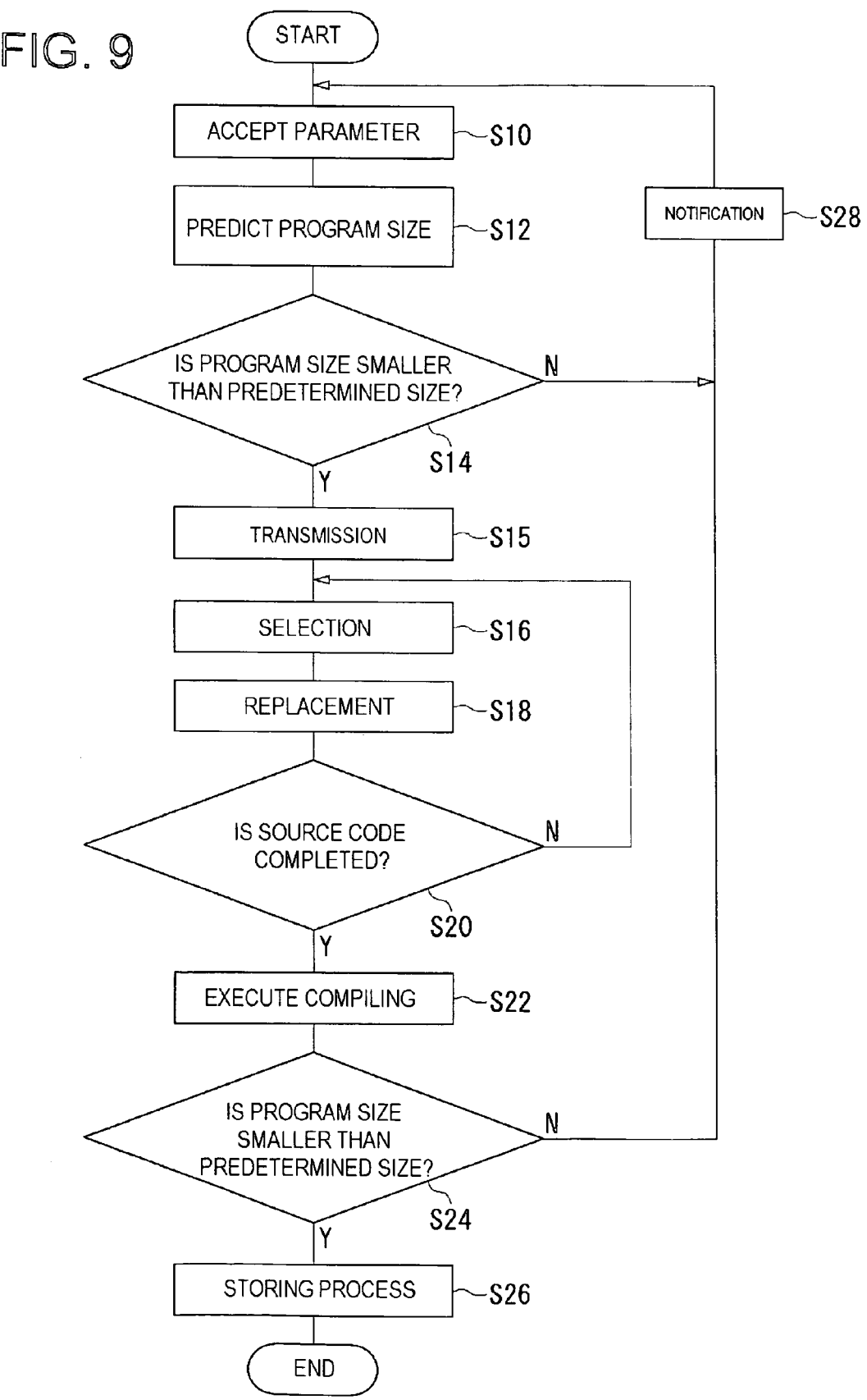
FIG. 9 is an example of a flow chart of a research program creating process executed by the program creating apparatus in FIG. 3 and the setting apparatus in FIG. 4.

FIG. 9 is an example of a flow chart of a research program creating process in the program creating apparatus 100 in FIG. 3 and the setting apparatus 500 in FIG. 4. The limiting unit 122 in FIG. 4 accepts a parameter file from the parameter managing unit 109 (S10), and predicts the program size of the research program on the basis of a parameter included in the parameter file (S12). The limiting unit 122 in FIG. 4 determines whether or not the predicted program size is smaller than the preset maximum program size (S14). When the predicted program size is larger than the maximum program size (N in S14), the notifying unit 508 in FIG. 4 notifies that the number of research items is to be reduced (S28).

When the predicted program size is smaller than the maximum program size in S14 (Y in S14), the transmitting unit 506 in FIG. 4 transmits the parameter file to the program creating apparatus 100 (S15). The producing unit 112 in FIG. 3 selects a model from the model storing unit 128 in FIG. 3 on the basis of the parameter included in the parameter file (S16) and replaces a predetermined argument in the model with the parameter in the parameter file (S18).

The producing unit 112 determines whether or not the source code is completed (S20). When the source code is not completed (N in S20), the flow returns to S16. When the source code is completed (Y in S20), the producing unit 112 outputs the effect to the instructing unit 120 in FIG. 3. The instructing unit 120 instructs the compiling unit 114 in FIG. 3 to compile the source code. In this manner, the compiling unit 114 executes compiling (S22).

After the research program is completed, the compiling unit 114 outputs the research program to the checking unit 116 in FIG. 3. The checking unit 116 determines whether or not the program size of the research program is smaller than the maximum program size (S24). When the program size is larger than the maximum program size (N in S24), the notifying unit 106 notifies that the number of research items is to be reduced (S28). When the program size is smaller than the maximum program size (Y in S24), the checking unit 116 outputs the research program to the storing process unit 118 in FIG. 3, and the storing process unit 118 outputs the research program to the program providing apparatus 200 in FIG. 1 to make it possible to provide the research program to the terminal device 50 in FIG. 1 (S26).

The functions of the program creating apparatus 100 are described by using a research program as an example. However, the program creating apparatus 100 may create not only a research program but also various programs for, for example, a questionnaire, a quiz, and the like.

The present invention has been described with reference to the embodiment. The embodiment is an exemplification, and it will be understood by a person skilled in the art that various modifications can be effected by combining the respective constituent elements and the respective processing processes and that such modifications fall within the scope of the invention.

The invention claimed is:

1. A program creating apparatus for creating a research program which performs a research on the basis of a predetermined research content including a plurality of research items at a predetermined point of research by using a mobile terminal device carried with a researcher, said mobile terminal device including a display unit for displaying a work screen in which a plurality of input interfaces are formed to input an answer to said plurality of research items of said predetermined research content when executing said research program, a position information acquiring unit for acquiring a position information of said device, and a photographing unit for photographing a designated object, comprising:

a screen information storing unit which holds screen information that forms an input screen including a component setting region to accept information as a parameter required to create said research program to form a component for forming a plurality of research item designating regions to display information representing said plurality of research items of said predetermined research content, and a research result input region in which said plurality of input interfaces are formed to input an answer to said plurality of research items, or a component for designating that said position information acquiring unit or said photographing unit of said mobile terminal device is used, said information being input by a user, a component adding operation button group to accept an instruction to add said component of a type selected from a plurality of types of said component by allowing said user to select a type suitable for said research item added to said work screen, said component adding operation button group being used in the case of adding said research item to said work screen, and a producing button to instruct that a source code is produced by using information required to form said components depending on said type which is input by said user operation, said plurality of research item designating regions and said research result input region being displayed on said work screen displayed on said display unit of said mobile terminal device when said mobile terminal device executes said research program, and which produces information to form said input screen in which each of said component setting region is formed to accept information as said parameter required to form said component depending on said selected type, said information being input by said user, every time said component adding operation button group is operated, the parameter representing a question to be displayed on a display of a predetermined terminal device when the program is executed;

a providing unit which provides said screen information to a setting apparatus connected through a network;

an accepting unit which accepts the parameter input on the input screen displayed on the basis of said screen information from said setting apparatus through said network, said input screen including a plurality of said component setting regions to input said plurality of parameters for forming said plurality of components suitable for said plurality of research items on said work screen;

a model storing unit which holds a program code for forming said respective components as a plural types of models using said parameter as an argument in association with said type information which specifies said type of said component;

a producing unit which produces a source code of said research program by selecting a plurality of models from said model storing unit for forming respective components corresponding to said type information of said plurality of components to combine said models and setting said parameter in said argument of said model on the basis of respective type information of said plurality of components corresponding to said plurality of research items included in said plurality of parameters accepted by said accepting unit, and upon completion of production of the said source code, which outputs the effect as a source code completion notification;

a compiling unit which compiles said source code of said research program produced by said producing unit to create said research program that can be executed by said mobile terminal device; and an instructing unit which instructs said compiling unit to compile said source code in response to said source code completion notification which is output from said producing unit.

2. The program creating apparatus as set forth in claim 1, further comprising:

a checking unit which checks whether or not the data size of said research program produced by said compiling unit is smaller than a predetermined size to make it possible to provide said research program to said mobile terminal device when the size of said research program is smaller than a predetermined size.

3. The program creating apparatus as set forth in claim 2, further comprising:

a notifying unit which performs notification to urge said setting apparatus to reduce the number of said parameters when the size of said research program is larger than said predetermined size.

4. The program creating apparatus as set forth in claim 2, wherein said predetermined size is set for each mobile terminal device which uses said research program.

5. The program creating apparatus as set forth in claim 2, further comprising:

a first program storing unit which stores a research program checked by said checking unit; and a providing unit which provides and distributes said research program stored in said first program storing unit to said mobile terminal device through a network, wherein said checking unit stores, when the size of said research program created by said compiling unit is smaller than the predetermined size, the research program in said first program storing unit.

6. The program creating apparatus as set forth in claim 5, wherein said providing unit provides said research program for said mobile terminal device in response to a request from said mobile terminal device.

7. The program creating apparatus as set forth in claim 5, wherein said program providing unit authenticates said researcher by using identification information uniquely allocated to said mobile terminal device before providing said research program, and provides said research program for said mobile terminal device when said authentication is passed.

8. The program creating apparatus as set forth in claim 1, said screen information storing unit holding further screen information to form said input screen including a research item deletion component to accepts an operation to delete said component setting region of said research item in order to delete said corresponding research item, said program creating system further comprises:

a second program storing unit which holds a checking program that causes said setting apparatus to form a limiting unit that allows said setting apparatus to hold a table in which the types of parameters are associated with program sizes, to specify a program size for each parameter included in each type of parameter accepted by said accepting unit with reference to said table, and to estimate said size of said research program by adding said program sizes, said limiting unit further allows said setting apparatus to determine that the number of said research items must be reduced when the size of said specified research program is larger than said predetermined size, to determine that the number of said research items must not be reduced when the size of said specified research program is not larger than said predetermined size, and to allow said setting apparatus not to output said accepted parameter such that the data size of said program becomes smaller than said predetermined size when the determination is made that the number of said research items must be reduced, said limiting unit again allows said parameter managing unit to manage information input to said input screen as said parameters, allows said setting apparatus to accept said parameters from said parameter managing unit, and repeats said estimation and said determination, said limiting unit further allows said setting apparatus to output said accepted parameters when said determination is made that said research items must not be reduced, wherein said providing unit provides said second program to said setting apparatus together with said screen information.

9. The program creating apparatus as set forth in claim 8, further comprising said setting apparatus, said setting apparatus including:

an acquiring unit which acquires said screen information from said providing unit through a network;

a display process unit which displays said input screen in which said plurality of component setting regions are formed on said screen display unit to input said plurality of parameters for forming said plurality of components suitable for said plurality of research items on said work screen on the basis of said screen information;

a managing unit manages information which is input by said user operation through said input screen as a plurality of parameters to form said work screen, and which outputs said plurality of parameters required to form said plurality of components and input in said plurality of component setting regions corresponding to said plurality of research items formed in said input screen in association with respective type information which specifies said corresponding type of said plurality of said components when said producing button operation is accepted; and a transmitting unit which outputs the parameter managed by said managing unit to said accepting unit that creates said program through said network.

10. The program creating apparatus as set forth in claim 9, wherein said acquiring unit of said setting apparatus acquires said checking program from said providing unit through said network and forms said limiting unit, said transmitting unit of said setting apparatus outputs parameters within the limits imposed by said limiting unit of said setting apparatus to said accepting unit.

11. The program creating apparatus as set forth in claim 10, wherein said setting apparatus further comprises:

a notifying unit which notifies said display process unit to display a message that urges reduction of the number of said parameters on said display unit when the number of said parameters must be limited.

12. The program creating apparatus as set forth in claim 10, wherein said managing unit of said setting apparatus groups said parameters of said component for each of said research items into parameter groups each of which is a group including said parameters corresponding one research item to form one page of said work screen, hold said parameter group while being grouped for each of said research items, and outputs said parameter groups grouped for each of said research items to said accepting unit, said providing unit provides said setting apparatus with said checking program to create said limiting unit on said setting apparatus, said limiting unit determining whether or not the number of said research items must be reduced on the basis of the number of said parameter groups accepted by said managing unit.

13. The program creating apparatus as set forth in claim 11, wherein said providing unit provide said checking program for said setting apparatus to create said limiting unit on said setting apparatus, said limiting unit compares the number of parameters managed by said managing unit with a predetermined number to determine whether or not the number of said research items must be reduced.

14. The program creating apparatus as set forth in claim 13, wherein said providing unit provide said checking program for said setting apparatus to create said limiting unit on said setting apparatus, when the number of parameters managed by said managing unit is larger than said predetermined number, said limiting unit determines that the number of said research items must be reduced.

15. The program creating apparatus as set forth in claim 1, wherein said research item designating region of said work screen includes a research content character string representing said research content and an image relevant to said research content in order to notify said researcher of said research content, said input screen information producing unit produces information to form said input screen for allowing said user to specify research content character string and said image to be displayed on said research item designating region of said work screen.

16. The program creating apparatus as set forth in claim 15, wherein said input screen information producing unit produces information to form said input screen including said component setting region for designating an appearance of merchandise, and an image to explain a technical term included in said research content as said image being displayed on said research item designating region of said work screen, said component setting region of said input screen allowing said user to designate said image to be displayed on said work screen.

17. The program creating apparatus as set forth in claim 16, wherein said component to inform said input interface includes a text box to input a text, a radio button with which one answer can be selected from a plurality of options, and a check box with which the arbitrary number of answers can be selected from a plurality of options.

18. A non-transitory computer-readable medium, storing a program creating program for creating a research program which performs a research on the basis of a predetermined research content including a plurality of research items at a predetermined point of research by using a mobile terminal device carried with a researcher, said mobile terminal device including a display unit for displaying a work screen in which a plurality of input interfaces are formed to input an answer to said plurality of research items of said predetermined research content when executing said research program, a position information acquiring unit for acquiring a position information of said device, and a photographing unit for photographing a designated object, said program creating program being executed by a processor of a computer comprising:

a screen information storing unit which holds screen information that forms an input screen including a component setting region to accept information as a parameter required to create said research program to form a component for forming a plurality of research item designating regions to display information representing said plurality of research items of said predetermined research content, and a research result input region in which said plurality of input interfaces are formed to input an answer to said plurality of research items, or a component for designating that said position information acquiring unit or said photographing unit of said mobile terminal device is used, said information being input by a user, a component adding operation button group to accept an instruction to add said component of a type selected from a plurality of types of said component by allowing said user to select a type suitable for said research item added to said work screen, said component adding operation button group being used in the case of adding said research item to said work screen, and a producing button to instruct that a source code is produced by using information required to form said components depending on said type which is input by said user operation, said plurality of research item designating regions and said research result input region being displayed on said work screen displayed on said display unit of said mobile terminal device when said mobile terminal device executes said research program, and which produces information to form said input screen in which each of said component setting region is formed to accept information as said parameter required to form said component depending on said selected type, said information being input by said user, every time said component adding operation button group is operated, the parameter representing a question to be displayed on a display of a predetermined terminal device when the program is executed; and a model storing unit which holds a program code for forming said respective components as a plural types of models using said parameter as an argument in association with said type information which specifies said type of said component, when said program creating program being executed by said processor, said program creating program causes said computer to realize:

a providing unit which provides said screen information to a setting apparatus connected through a network;

an accepting unit which accepts the parameter input on the input screen displayed on the basis of said screen information from said setting apparatus through said network;

a producing unit which produces a source code of said research program by selecting a plurality of models from said model storing unit for forming respective components corresponding to said type information of said plurality of components to combine said models and setting said parameter in said argument of said model on the basis of respective type information of said plurality of components corresponding to said plurality of research items included in said plurality of parameters accepted by said accepting unit, and upon completion of production of the said source code, which outputs the effect as a source code completion notification;

a compiling unit which compiles said source code of said research program produced by said producing unit to create said research program that can be executed by said mobile terminal device; and an instructing unit which instructs said compiling unit to compile said source code in response to said source code completion notification which is output from said producing unit.

19. A program creating unit for creating a research program which performs a research on the basis of a predetermined research content including a plurality of research items at a predetermined point of research by using a mobile terminal device carried with a researcher, said mobile terminal device including a display unit for displaying a work screen in which a plurality of input interfaces are formed to input an answer to said plurality of research items of said predetermined research content when executing said research program, a position information acquiring unit for acquiring a position information of said device, and a photographing unit for photographing a designated object, said program creating program being executed by a processor of a computer comprising:

a screen information storing unit which holds screen information that forms an input screen including a component setting region to accept information as a parameter required to create said research program to form a component for forming a plurality of research item designating regions to display information representing said plurality of research items of said predetermined research content, and a research result input region in which said plurality of input interfaces are formed to input an answer to said plurality of research items, or a component for designating that said position information acquiring unit or said photographing unit of said mobile terminal device is used, said information being input by a user, a component adding operation button group to accept an instruction to add said component of a type selected from a plurality of types of said component by allowing said user to select a type suitable for said research item added to said work screen, said component adding operation button group being used in the case of adding said research item to said work screen, and a producing button to instruct that a source code is produced by using information required to form said components depending on said type which is input by said user operation, said plurality of research item designating regions and said research result input region being displayed on said work screen displayed on said display unit of said mobile terminal device when said mobile terminal device executes said research program, and which produces information to form said input screen in which each of said component setting region is formed to accept information as said parameter required to form said component depending on said selected type, said information being input by said user, every time said component adding operation button group is operated, the parameter representing a question to be displayed on a display of a predetermined terminal device when the program is executed; and a model storing unit which holds a program code for forming said respective components as a plural types of models using said parameter as an argument in association with said type information which specifies said type of said component, said program creating unit causing a computer to realize:

a providing unit which provides said screen information to a setting apparatus connected through a network;

an accepting unit which accepts the parameter input on the input screen displayed on the basis of said screen information from said setting apparatus through said network;

a producing unit which produces a source code of said research program by selecting a plurality of models from said model storing unit for forming respective components corresponding to said type information of said plurality of components to combine said models and setting said parameter in said argument of said model on the basis of respective type information of said plurality of components corresponding to said plurality of research items included in said plurality of parameters accepted by said accepting unit, and upon completion of production of the said source code, which outputs the effect as a source code completion notification;

a compiling unit which compiles said source code of said research program produced by said producing unit to create said research program that can be executed by said mobile terminal device; and an instructing unit which instructs said compiling unit to compile said source code in response to said source code completion notification which is output from said producing unit.

20. A non-transitory computer-readable medium, storing a program creating program for creating a research program which performs a research on the basis of a predetermined research content including a plurality of research items at a predetermined point of research by using a mobile terminal device carried with a researcher, said mobile terminal device including a display unit for displaying a work screen in which a plurality of input interfaces are formed to input an answer to said plurality of research items of said predetermined research content when executing said research program, a position information acquiring unit for acquiring a position information of said device, and a photographing unit for photographing a designated object, said program creating program being executed by a processor of a computer comprising:

a screen information storing unit which holds screen information that forms an input screen including a component setting region to accept information as a parameter required to create said research program to form a component for forming a plurality of research item designating regions to display information representing said plurality of research items of said predetermined research content, and a research result input region in which said plurality of input interfaces are formed to input an answer to said plurality of research items, or a component for designating that said position information acquiring unit or said photographing unit of said mobile terminal device is used, said information being input by a user, a component adding operation button group to accept an instruction to add said component of a type selected from a plurality of types of said component by allowing said user to select a type suitable for said research item added to said work screen, said component adding operation button group being used in the case of adding said research item to said work screen, and a producing button to instruct that a source code is produced by using information required to form said components depending on said type which is input by said user operation, said plurality of research item designating regions and said research result input region being displayed on said work screen displayed on said display unit of said mobile terminal device when said mobile terminal device executes said research program, and which produces information to form said input screen in which each of said component setting region is formed to accept information as said parameter required to form said component depending on said selected type, said information being input by said user, every time said component adding operation button group is operated, the parameter representing a question to be displayed on a display of a predetermined terminal device when the program is executed; and a model storing unit which holds a program code for forming said respective components as a plural types of models using said parameter as an argument in association with said type information which specifies said type of said component, when said program creating program being executed by said processor, said program creating program causes said computer to realize:

a providing unit which provides said screen information to a setting apparatus connected through a network;

an accepting unit which accepts the parameter input on the input screen displayed on the basis of said screen information from said setting apparatus through said network;

a producing unit which produces a source code of said research program by selecting a plurality of models from said model storing unit for forming respective components corresponding to said type information of said plurality of components to combine said models and setting said parameter in said argument of said model on the basis of respective type information of said plurality of components corresponding to said plurality of research items included in said plurality of parameters accepted by said accepting unit, and upon completion of production of the said source code, which outputs the effect as a source code completion notification;

a compiling unit which compiles said source code of said research program produced by said producing unit to create said research program that can be executed by said mobile terminal device; and an instructing unit which instructs said compiling unit to compile said source code in response to said source code completion notification which is output from said producing unit, the program further causing a computer for realizing said setting apparatus of the program creating system as set forth in claim 1 to realize:

an acquiring unit which acquires said screen information from said providing unit of said program creating system through a network;

a display process unit which displays said input screen in which said plurality of component setting regions are formed on a display unit to input said plurality of parameters for forming said plurality of components suitable for said plurality of research items on said work screen on the basis of said screen information;

a managing unit which manages information which is input by said user operation through said input screen as a plurality of parameters to form said work screen, and which outputs said plurality of parameters required to form said plurality of components and input in said plurality of component setting regions corresponding to said plurality of research items formed in said input screen in association with respective type information which specifies said corresponding type of said plurality of said components when said producing button operation is accepted; and a transmitting unit which outputs the parameter managed by said managing unit to said accepting unit of said program creating system that creates said program through said network.

21. A program creating module unit for creating a research program which performs a research on the basis of a predetermined research content including a plurality of research items at a predetermined point of research by using a mobile terminal device carried with a researcher, said mobile terminal device including a display unit for displaying a work screen in which a plurality of input interfaces are formed to input an answer to said plurality of research items of said predetermined research content when executing said research program, a position information acquiring unit for acquiring a position information of said device, and a photographing unit for photographing a designated object, said program creating program being executed by a processor of a computer comprising:

a screen information storing unit which holds screen information that forms an input screen including a component setting region to accept information as a parameter required to create said research program to form a component for forming a plurality of research item designating regions to display information representing said plurality of research items of said predetermined research content, and a research result input region in which said plurality of input interfaces are formed to input an answer to said plurality of research items, or a component for designating that said position information acquiring unit or said photographing unit of said mobile terminal device is used, said information being input by a user, a component adding operation button group to accept an instruction to add said component of a type selected from a plurality of types of said component by allowing said user to select a type suitable for said research item added to said work screen, said component adding operation button group being used in the case of adding said research item to said work screen, and a producing button to instruct that a source code is produced by using information required to form said components depending on said type which is input by said user operation, said plurality of research item designating regions and said research result input region being displayed on said work screen displayed on said display unit of said mobile terminal device when said mobile terminal device executes said research program, and which produces information to form said input screen in which each of said component setting region is formed to accept information as said parameter required to form said component depending on said selected type, said information being input by said user, every time said component adding operation button group is operated, the parameter representing a question to be displayed on a display of a predetermined terminal device when the program is executed; and a model storing unit which holds a program code for forming said respective components as a plural types of models using said parameter as an argument in association with said type information which specifies said type of said component, said program creating unit causing a computer to realize:

a providing unit which provides said screen information to a setting apparatus connected through a network;

an accepting unit which accepts the parameter input on the input screen displayed on the basis of said screen information from said setting apparatus through said network;

a producing unit which produces a source code of said research program by selecting a plurality of models from said model storing unit for forming respective components corresponding to said type information of said plurality of components to combine said models and setting said parameter in said argument of said model on the basis of respective type information of said plurality of components corresponding to said plurality of research items included in said plurality of parameters accepted by said accepting unit, and upon completion of production of the said source code, which outputs the effect as a source code completion notification;

a compiling unit which compiles said source code of said research program produced by said producing unit to create said research program that can be executed by said mobile terminal device; and an instructing unit which instructs said compiling unit to compile said source code in response to said source code completion notification which is output from said producing unit, the program further causing a computer for realizing said setting apparatus of the program creating system as set forth in claim 1 to realize:

an acquiring unit which acquires said screen information from said providing unit of said program creating system through a network;

a display process unit which displays said input screen in which said plurality of component setting regions are formed on a display unit to input said plurality of parameters for forming said plurality of components suitable for said plurality of research items on said work screen on the basis of said screen information;

a managing unit which manages information which is input by said user operation through said input screen as a plurality of parameters to form said work screen, and which outputs said plurality of parameters required to form said plurality of components and input in said plurality of component setting regions corresponding to said plurality of research items formed in said input screen in association with respective type information which specifies said corresponding type of said plurality of said components when said producing button operation is accepted; and a transmitting unit which outputs the parameter managed by said managing unit to said accepting unit of said program creating system that creates said program through said network.

* * * * *